US008332655B2

(12) United States Patent
Gupta

(10) Patent No.: US 8,332,655 B2
(45) Date of Patent: Dec. 11, 2012

(54) METHOD FOR ORDER INVARIANT CORRELATED ENCRYPTING OF DATA AND SQL QUERIES FOR MAINTAINING DATA PRIVACY AND SECURELY RESOLVING CUSTOMER DEFECTS

(75) Inventor: Pramod Gupta, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 12/363,356

(22) Filed: Jan. 30, 2009

(65) Prior Publication Data

US 2010/0198846 A1 Aug. 5, 2010

(51) Int. Cl.
*G06F 17/30* (2006.01)
(52) U.S. Cl. ......... 713/189; 713/165; 713/168; 713/193
(58) Field of Classification Search .................... 713/189
See application file for complete search history.

(56) References Cited

U.S. PATENT DOCUMENTS

| 7,395,437 B2* | 7/2008 | Agrawal et al. ............... 713/193 |
| 7,738,022 B2* | 6/2010 | Shimono et al. ............. 348/312 |
| 2002/0104002 A1* | 8/2002 | Nishizawa et al. ........... 713/168 |
| 2005/0027680 A1* | 2/2005 | Yagawa et al. .................... 707/1 |
| 2005/0166046 A1* | 7/2005 | Bellovin et al. ............... 713/165 |
| 2008/0133935 A1* | 6/2008 | Elovici et al. ................. 713/193 |
| 2008/0181396 A1* | 7/2008 | Balakrishnan et al. ......... 380/28 |
| 2008/0183656 A1* | 7/2008 | Perng et al. ...................... 707/2 |
| 2009/0019092 A1* | 1/2009 | Dettinger et al. ............. 707/202 |
| 2009/0327748 A1* | 12/2009 | Agrawal et al. ............... 713/189 |
| 2010/0106980 A1* | 4/2010 | Kerschbaum et al. ........ 713/193 |
| 2010/0169665 A1* | 7/2010 | Kang et al. .................... 713/189 |
| 2010/0250958 A1* | 9/2010 | Browning ..................... 713/189 |

OTHER PUBLICATIONS

Agrawal et al., "Order Preserving Encryption for Numeric Data", SIGMOD 2004 Jun. 13-18, 2004, Paris, France.

* cited by examiner

*Primary Examiner* — Kambiz Zand
*Assistant Examiner* — Yonas Bayou
(74) *Attorney, Agent, or Firm* — Patterson & Sheridan, LLP

(57) ABSTRACT

According to one embodiment of the present invention, a method for debugging a computer system is provided. According to one embodiment of the invention, a method includes encrypting data and query program instructions using correlated order invariant encrypting, the data and query program instructions operating in a customer computer system. The encrypted data and encrypted query program instructions are then transferred to a servicing entity having a test system. The encrypted data and encrypted query program instructions are run on the test system to generate a set of results. The set of results are then used to generate a diagnosis of a problem with the customer computer system. Thus the customer problem can be resolved without the servicing entity having access to the customer's data and query program instructions.

19 Claims, 3 Drawing Sheets

METHOD FOR ORDER INVARIANT CORRELATED ENCRYPTING OF DATA AND SQL QUERIES FOR MAINTAINING DATA PRIVACY AND SECURELY RESOLVING CUSTOMER DEFECTS

BACKGROUND

The present invention relates to maintaining privacy of data, and more specifically, to resolving defects in query language software e.g. Structured Query Language (SQL) software, while maintaining data privacy.

There has been a rapid increase in the amount of data collected and stored on databases. Much data, such as an individual's personal information, is very sensitive and must be kept confidential to avoid misuse of the data, which could result in crimes such as fraud and identity theft. Accordingly, it has become essential to develop effective techniques for protecting the privacy of sensitive data. Protecting the privacy of data can be difficult in certain situations. When a customer's database system has a defect, the customer can usually rely on a database system servicing entity to debug and correct the defect. In some situations, because of privacy concerns, it may not be desirable or permissible for the customer to give an outside entity servicing the problem access to the customer's data. This can make it more difficult for the servicing entity to resolve the problem.

For example, when a servicing entity is attempting to debug customer defects involving SQL, ideally, the customer might send the data used with the problematic SQL to the servicing entity to enable them to reproduce the problem on test systems for debugging the problem. In many situations, however, the servicing entity may not be allowed to have access to the data, or to the SQL, because of legal concerns about privacy of the customer's data. This makes it difficult to reproduce the problems on the test systems for debugging. For purpose of illustration we use the example of SQL as the query language since it is the most common query language. However, the following discussion is applicable to other query languages, e.g. XQuery.

SUMMARY

According to one embodiment of the present invention, a method comprises: encrypting data and query program instructions using order invariant correlated encrypting, the data and query program instructions operating in a customer computer system; transferring the encrypted data and query program instructions to a servicing entity having a test system; running the encrypted data and encrypted query program instructions on the test system to generate a set of results; generating a diagnosis of a problem with the customer computer system using the set of results.

According to another embodiment of the present invention, a method comprises: generating the same number of random data entries as there are data entries in a column of data entries; mapping each of the random data entries to one of the data entries, such that the random data entries are arranged in a column in order; the same mapping is used to encrypt the data entries and the corresponding query program instructions.

According to a further embodiment of the present invention, a system comprises: a customer computer system, running data and query program instructions, there being a defect in the operation of the computer system; an encryption unit for encrypting the data and query program instructions using correlated order invariant encryption; and a test system operated by a servicing entity, for receiving and debugging the encrypted data and encrypted query program instructions.

According to another embodiment of the present invention, a computer program product for order invariant encryption of data comprises: a computer usable medium having computer usable program code embodied therewith, the computer usable program code comprising: computer usable program code configured to: generate the same number of random data entries as there are data entries in a column of data entries; map each of the random data entries to one of the data entries, such that the random data entries are arranged in a column in order; the same mapping is used to encrypt the data entries and the corresponding query program instructions.

DETAILED DESCRIPTION

Figure 1:
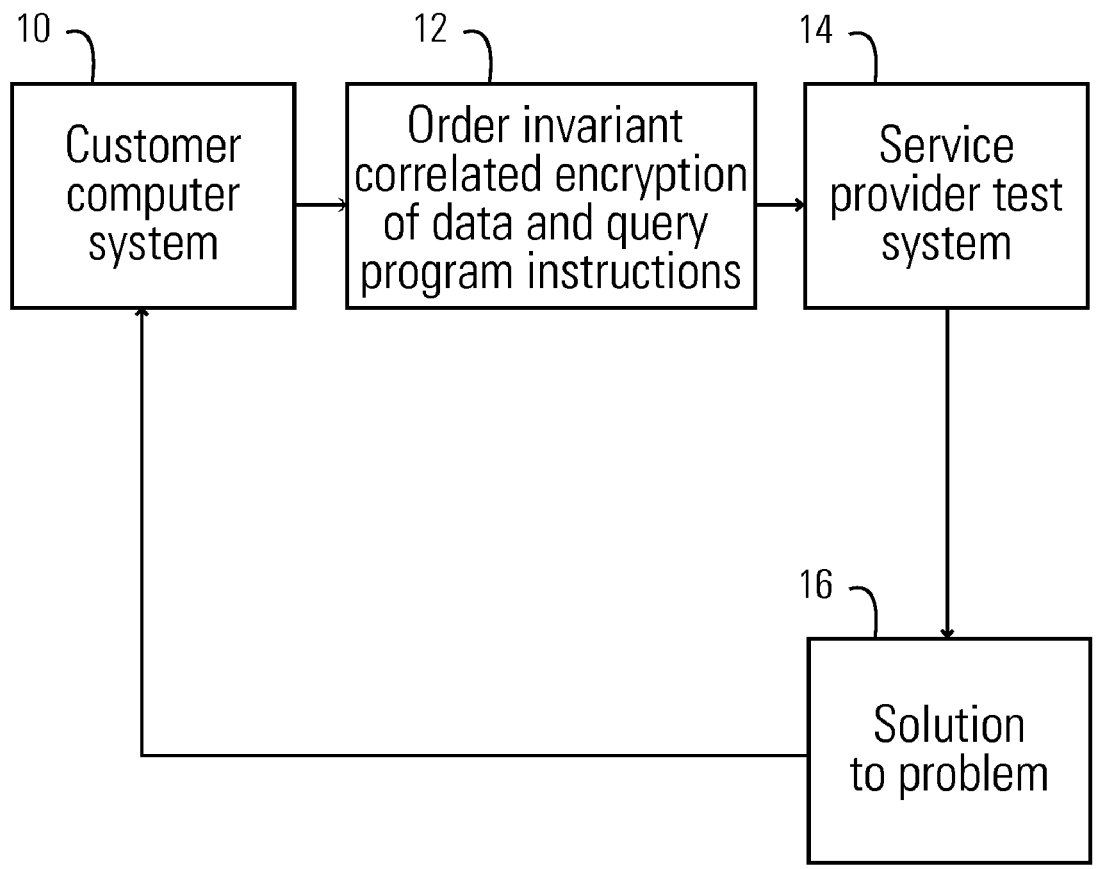
FIG. 1 shows a diagram of a system for securely debugging and repairing a customer database system in accordance with an embodiment of the invention.

Embodiments of the invention provide system, method and computer program product for securely resolving customer defects in a database system. For purpose of illustration we use the example of SQL as the query language since it is the most common query language. However, the embodiments of the invention are general and applicable to other query languages e.g. XQuery. In particular, the invention uses correlated order invariant correlated encrypting of data and SQL queries for maintaining data privacy while resolving customer defects. By order invariant encrypting of the data and the SQL statements, as described below, the encrypted data and encrypted SQL statements can be used for debugging the problem on a servicing entity's test system. This makes it much easier to resolve the customer defect without access to the unencrypted customer data and queries and hence the servicing entity requires much less time to fix the defect for the customer. In prior systems, it would be much more difficult for a servicing entity to resolve customer defects without access to the data and SQL queries. In this disclosure the terms "order invariant" and "order preserving" are used interchangeably.

Embodiments of the present invention encrypt the string data and the queries in an order invariant, correlated, way. This ensures that even though the string data is encrypted, it can be used with the appropriately encrypted queries. Hence, customers do not have to be concerned about privacy since the servicing entity does not have the customer's original data. At the same time, the servicing entity can use the encrypted data and SQL for debugging the customer defect on its test systems.

Embodiments of the invention use order preserving encryption. The publication, "Order Preserving Encryption for Numeric Data" by Agrawal et al., http://www.almaden.ibm.com/cs/projects/iis/hdb/Publications/papers/opes.pdf discloses order preserving encryption for numerical data, and is incorporated herein by reference. However, the Agrawal publication is limited to numerical data and does not cover the important case of text/string/character data. In this disclosure the terms text, string, and characters are used interchangeably. String data is very common in databases. Since the Agrawal publication does not cover the case of strings, it cannot be used to implement order preserving encryption for a real database. The present invention teaches the use of order preserving encryption for strings.

The simple case of a table with a single integer column will be discussed to facilitate the understanding of use of the present invention with string data, as discussed later. This example can be easily generalized to all columns of a table using multi-column order invariant encryption and to more complex SQL.

Consider the integer column C1 of a table T1. The column C1 has the data 1, 23, 5, 87. Consider a SQL query 'select C1 from T1 where C1=5'. Next, the data in the column is encrypted. It should be noted that the data is encrypted in such a way that the ordering is preserved so that the behavior of the encrypted data and encrypted SQL on the test system is similar to the behavior of the unencrypted data and SQL on the customer system.

In this example, a simple case is illustrated for integers where each original integer is replaced by a randomly generated integer which is such that it preserves the ordering of the sequence of integers. After the order invariant data encryption, let C1 have the encrypted data 2345, 5678, 3451, 8901. Note that the relative ordering of the data has been preserved. Just like original value 1 is smaller that the other three numbers, the encrypted value 2345 is smaller that the other encrypted three numbers. Similarly the other three encrypted numbers have the same ordering as the original numbers.

The SQL query is also encrypted in a correlated way and it becomes 'select C1 from T1 where C1=3451'. Here the encrypted value 3451 corresponds to the original value 5. Hence when this encrypted query is executed on the encrypted data the same type of result set will be produced as when the original query is executed against the original data. Correlated encryption of data and query program instructions means that the same mapping is used to encrypt the data entries and the corresponding query program instructions. As mentioned above, the above example of an integer column is for illustration only.

Referring now to FIG. 1 there is shown a diagram of a system for securely debugging and repairing a customer database system in accordance with an embodiment of the invention. It is assumed that a customer data system 10, such as a database system, is experiencing a problem. The customer identifies the data and SQL queries involved with the problem. The customer then uses an encryption system 12 coupled to the customer data system 10 to encrypt this identified problem data and SQL queries. Note that only the customer has access to the customer data system 10 and to the encryption system 12. The customer then sends the encrypted data to a servicing entity test system 14 for debugging and resolution of the problem.

The servicing entity may then use the encrypted data and encrypted SQL to debug and determine a solution to the problem. This solution 16 may then be implemented on the customer data system 10. Note that throughout this process, the servicing entity never has access to the unencrypted data or to the unencrypted SQL queries. Also, because the data and SQL queries have been encrypted in an order invariant and correlated manner, as disclosed below, the encrypted data and encrypted SQL behaves in a similar manner as the unencrypted data and unencrypted SQL. This enables the servicing entity to debug and resolve the problem.

The case of encrypting string data according to an embodiment of the invention will now be discussed. An exemplary case is will be discussed beginning with a snippet of 7 bit ASCII table as shown below:
A 65
B 66
C 67
D 68
Consider a two character column with below-sorted data:
AA
AB
BC
BD
Now the strings will be regarded as base 128 numbers. First, the strings are mapped to a decimal number as follows:
AA→65×128^1+65×128^=8320+65=8385
AB→65×128^1+66×128^0=8320+66=8386
BC→66×128^1+67×128^0=8448+67=8515
BD→66×128^1+68×128^0=8448+68=8516
Then the SQL is rewritten as follows:
like 'A%'
becomes
>='A' AND <'B'
A→65×128^0=65
B→66×128^0=66
Next, random numbers are generated as in the case of numeric data. Note that for this 2 character column, the range for the random numbers is limited to 128*128=16384. In a real database the character columns will be much larger than 2 characters. For example they may include first name, last name, address, etc. Note that the range becomes larger for larger strings and hence the encryption becomes better. The range will be 128^Q where Q is the number of characters in the string.

Now the mapping is constructed by generating six random numbers in the range 1 to 16384 and then sorting them as shown on right hand side of below mapping. The left hand side is the sorted unencrypted character string values. The right hand side is the sorted encrypted numerical values:
A->65->234
B->66->512
AA->8385->1234
AB->8386->2010
BC->8515->15004
BD->8516->16002
The right hand side numerical encrypted value above is encrypted into a two character ASCII string. The following is the complete calculation for A:
A->65->234->1×128^1+106×128^0->ASCII SOH character and lower case j
Hence, in the mapping table there will be a line:
A->ASCII SOH character and lower case j
The following is a complete calculation for AB:
AB->8386->1234->9×128^1+83×128^0->ASCII Horizontal tab and upper case S
Hence, in the mapping table there will be a line:
AB->ASCII Horizontal tab and upper case S
Similarly, for the other character strings the corresponding encrypted two character strings will be produced.

The security of the encryption is an important consideration. The above encryption approach uses a substitution cipher. Note that the usual substitution cipher is sometimes regarded as weak because: (a) there is a small number of unencrypted and encrypted values e.g. 26 English letters mapped to 26 English letters; and (b) the key which is a mapping of the unencrypted and encrypted values has to be transferred in an insecure way between sender of the message and the receiver. This is why public key/private key encryption/decryption is useful to avoid having to transfer the key between the sender and the receiver.

Both of these weaknesses are not present in the present invention. Item (a) does not apply here since most of the columns in real database are much larger types than Boolean or 1 byte and the number of distinct values in a column are much smaller than the number of allowed values for that column. For example, consider an employee table with a numerical 4 byte salary column. The number of distinct salaries will be very small compared to the number of all allowed salaries. It is also known from customer experience with the DB2 row compression feature, that the number of distinct values is much smaller than the number of allowed values for a column.

Item (b) does not apply with the present invention since the values do not have to be decrypted. Hence once the data and the SQL are encrypted at the customer's site, the key can be deleted.

Now consider some numerical estimates for the security of the encryption. First consider a concrete example. Consider an integer column which has only A=20 allowed values. Let this column contain D=5 distinct values 4, 7, 11, 13, 40. Now there are N=(20)(19)(18)(17)(16) ways of selecting 5 values from the 20 allowed values. This can be rewritten as:

$N=(20!/15!)$ $N=(20!/(20-5)!)$

Now all the N ways of selecting 5 distinct values are not different for our approach since will sort the 5 values when the mapping between the original and encrypted values is constructed. Hence the number of ways M of distinct sorted values is:

$M=N/(5!)=20!/(15!5!)=15504.$

Now consider the more general case. Suppose distinct values D=(A/2). (let A be even to keep the discussion simple. The odd A case is similar.) Then:

$M=A!/(D!(A-D)!)$ $M=A!/((A/2)!(A/2)!)$

For large A, (Stirling approximation) (here log is the natural logarithm to base e):

$\log(A!)=A \log(A)-A$

Hence:

$M=\exp(A \log(A)-A)/(\exp((A/2)\log(A/2)-A/2)^2)$ $M=\exp(A \log(A)-A)/\exp(A \log(A)-A-A \log(2))$ $M=\exp(A \log(2))$ Thus, for large A and D=A/2, M is a very large number.

Note that M is the number of possible mappings between the encrypted and the encrypted values. This is the number of mappings one would have to try to break the encryption. However, even if someone tried all the possible mappings, they cannot break the encryption for numerical values since all numerical values are equally valid. (For data, one could break the encryption by trying out all the mappings and reading the computed unencrypted text. Only the correct mapping would translate the encrypted text into meaningful text.)

The above estimate of M=exp(A(log(2)) was based on number of distinct values D=(A/2) where A is the number of allowed values. Now in real databases the number of distinct values in the 4 byte integer columns may be hundreds of times less compared to the number of allowed values so that D=A/100. Hence, M will be even larger than the above example of exp(A log(2)).

Figure 2:
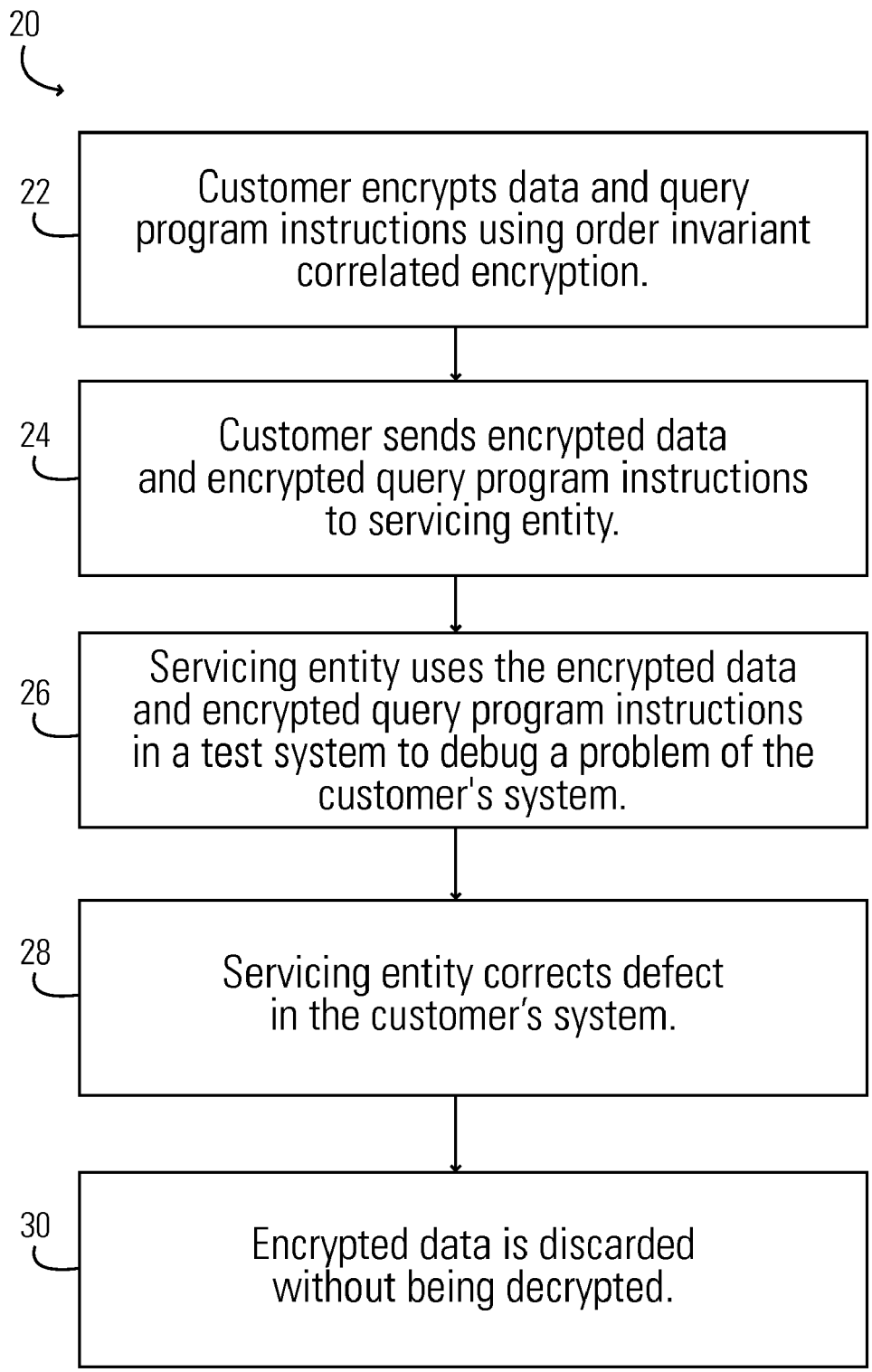
FIG. 2 shows a flowchart of a process for securely debugging and correcting a defect in a customer database system in accordance with an embodiment of the invention.

Referring now to FIG. 2, there is shown a flowchart of a process 20 for securely debugging and correcting a defect in a customer database system in accordance with an embodiment of the invention. In this example, a customer is experiencing a problem with a database system, such as the data system 10 shown in FIG. 1. In step 22, the customer encrypts data and SQL queries in an order invariant correlated manner, as discussed above. Correlated encryption of data and query program instructions means that the same mapping is used to encrypt the data entries and the corresponding query program instructions. In step 24, the encrypted data and encrypted SQL queries are sent to a servicing entity. The servicing entity then uses the encrypted data and encrypted SQL to debug the problem in a test system, in step 26. This may be done using test system 14 shown in FIG. 1. In step 28, the results of the debugging process are then used by the servicing entity to correct the defect in the customer system. In step 30, the servicing entity may discard the encrypted data, since it will not be needed again. As a result of process 20, the servicing entity does not have access to the unencrypted data and SQL and the security of the customer's information is maintained.

As can be seen from the above disclosure, embodiments of the invention provide techniques for using order invariant correlated encrypting of data and SQL queries for both numerical types and string types. Even though the data is encrypted, it can be used with the appropriately encrypted SQL queries. Hence, customers do not have to be concerned about privacy since the servicing entity does not have the customer's original data. At the same time, the servicing entity can use the encrypted data and SQL for debugging the customer defect on test systems. It will be appreciated that the present invention may also be applied to other kinds of systems besides those discussed above for illustrative purposes, including non-SQL systems.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer query program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
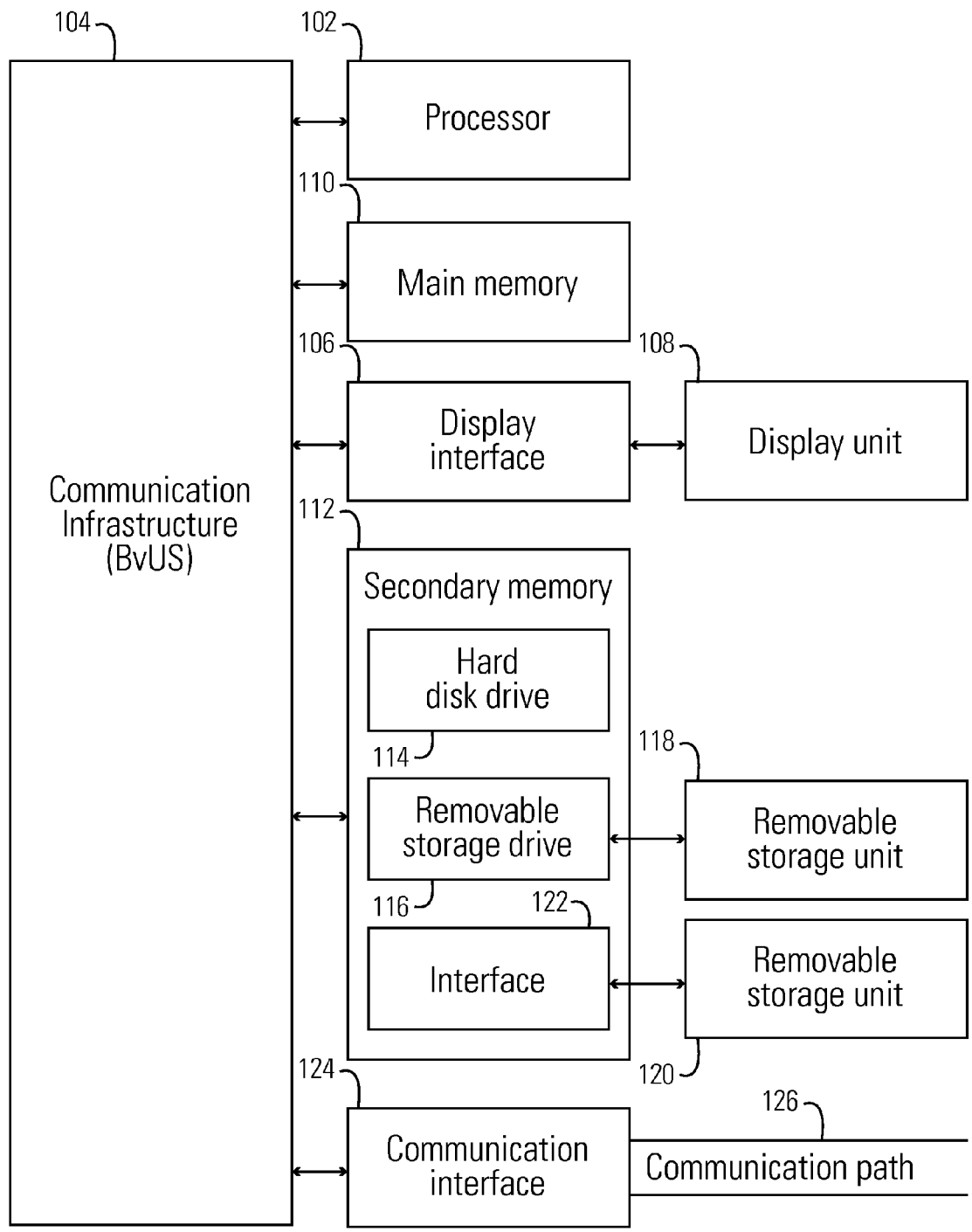
FIG. 3 shows a high level block diagram of an information processing system useful for implementing one embodiment of the present invention.

FIG. 3 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   encrypting data and query program instructions using correlated order invariant encrypting, said data and said query program instructions operating in a customer computer system, wherein said data comprises a column of character strings in a particular order, and wherein said encrypting comprises:
   converting each character in each of said character strings into an equivalent alternative numerical representation;
   regarding each sequence of equivalent alternative numerical representations generated by said converting as a single base 128 data entry;
   generating the same number of random base 128 entries as entries in said column of character strings;
   mapping each of said random base 128 entries to one of said base 128 data entries, such that said random base 128 entries are arranged in a column in order;
   converting each digit in said random base 128 entries into an equivalent alternative character representation; and
   constructing encrypted character string data by concatenating said equivalent alternative character representations;
   transferring said encrypted data and said encrypted query program instructions to a servicing entity having a test system;
   running said encrypted data and said encrypted query program instructions on said test system to generate a set of results; and
   generating a diagnosis of a problem with said customer computer system using said set of results which were generated on said test system.

2. The method of claim 1, further comprising correcting said problem in said customer computer system using said generated diagnosis.

3. The method of claim 1, wherein a sequence of said query program instructions are encrypted, and wherein said encrypting further comprises using a mapping to encrypt said query program instructions that is synonymous with a mapping used to encrypt said data.

4. The method of claim 3, wherein said query program instructions comprise SQL queries.

5. The method of claim 1 wherein each equivalent alternative character representation is selected from a group consisting of: ASCII, UNICODE, and EBCDIC.

6. The method of claim 1, wherein said data and said query program instructions are only transferred to said servicing entity in an encrypted state.

7. The method of claim 1, wherein said query program instructions include queries.

8. The method of claim 1, wherein said encrypting further comprises using correlated encrypting of said data and said query program instructions.

9. The method of claim 1, further comprising deleting said encrypted data and said encrypted query program instructions without decrypting them.

10. A non-transitory computer usable medium storing an application, which, when executed on a processor, performs an operation comprising:
    encrypting data and query program instructions using correlated order invariant encrypting, said data and said query program instructions operating in a customer computer system, wherein said data comprises a column of character strings in a particular order, and wherein said encrypting comprises:
    converting each character in each of said character strings into an equivalent alternative numerical representation;
    regarding each sequence of equivalent alternative numerical representations generated by said converting as a single base 128 data entry;
    generating the same number of random base 128 entries as entries in said column of character strings;

mapping each of said random base 128 entries to one of said base 128 data entries, such that said random base 128 entries are arranged in a column in order;

converting each digit in said random base 128 entries into an equivalent alternative character representation; and constructing encrypted character string data by concatenating said equivalent alternative character representations;

transferring said encrypted data and said encrypted query program instructions to a servicing entity having a test system;

running said encrypted data and said encrypted query program instructions on said test system to generate a set of results; and generating a diagnosis of a problem with said customer computer system using said set of results which were generated on said test system.

11. The non-transitory computer usable medium of claim 10, wherein said operation further comprises correcting said problem in said customer computer system using said generated diagnosis.

12. The non-transitory computer usable medium of claim 10, wherein a sequence of said query program instructions are encrypted, and wherein said encrypting further comprises using a mapping to encrypt said query program instructions that is synonymous with a mapping used to encrypt said data.

13. The non-transitory computer usable medium of claim 10, wherein each equivalent alternative character representation is selected from a group consisting of: ASCII, UNICODE, and EBCDIC.

14. The non-transitory computer usable medium of claim 10, wherein said data and said query program instructions are only transferred to said servicing entity in an encrypted state.

15. A system comprising:

a processor; and a memory storing a program, which, when executed on the processor, performs an operation comprising:

encrypting data and query program instructions using correlated order invariant encrypting, said data and said query program instructions operating in a customer computer system, wherein said data comprises a column of character strings in a particular order, and wherein said encrypting comprises:

converting each character in each of said character strings into an equivalent alternative numerical representation;

regarding each sequence of equivalent alternative numerical representations generated by said converting as a single base 128 data entry;

generating the same number of random base 128 entries as entries in said column of character strings;

mapping each of said random base 128 entries to one of said base 128 data entries, such that said random base 128 entries are arranged in a column in order;

converting each digit in said random base 128 entries into an equivalent alternative character representation; and constructing encrypted character string data by concatenating said equivalent alternative character representations;

transferring said encrypted data and said encrypted query program instructions to a servicing entity having a test system;

running said encrypted data and said encrypted query program instructions on said test system to generate a set of results; and generating a diagnosis of a problem with said customer computer system using said set of results which were generated on said test system.

16. The system of claim 15, wherein said operation further comprises correcting said problem in said customer computer system using said generated diagnosis.

17. The system of claim 15, wherein a sequence of said query program instructions are encrypted, and wherein said encrypting further comprises using a mapping to encrypt said query program instructions that is synonymous with a mapping used to encrypt said data.

18. The system of claim 15, wherein each equivalent alternative character representation is selected from a group consisting of: ASCII, UNICODE, and EBCDIC.

19. The system of claim 15, wherein said data and said query program instructions are only transferred to said servicing entity in an encrypted state.

* * * * *